United States Patent
Clark, IV et al.

(10) Patent No.: US 10,521,979 B2
(45) Date of Patent: Dec. 31, 2019

(54) FLEET ANALYTIC SERVICES TOOLSET

(71) Applicant: Sikorsky Aircraft Corporation, Stratford, CT (US)

(72) Inventors: Cyrus Clark, IV, Prospect, CT (US); Philip A. Hensley, Stratford, CT (US); Darlene Bohm, Shelton, CT (US); Rajesh Iyer, Shelton, CT (US); Christopher Lynch, Oxford, CT (US); Gregory J. Kacprzynski, Fairport, NY (US); Michael C. Kingsley, Oxford, CT (US); Tina Lohr, Hazel Green, AL (US); William Read, Avon, NY (US); Michael Koelemay, Rochester, NY (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 151 days.

(21) Appl. No.: 15/555,174

(22) PCT Filed: Mar. 3, 2016

(86) PCT No.: PCT/US2016/020603
§ 371 (c)(1),
(2) Date: Sep. 1, 2017

(87) PCT Pub. No.: WO2016/141138
PCT Pub. Date: Sep. 9, 2016

(65) Prior Publication Data
US 2018/0047224 A1 Feb. 15, 2018

Related U.S. Application Data

(60) Provisional application No. 62/128,715, filed on Mar. 5, 2015.

(51) Int. Cl.
*G07C 5/08* (2006.01)
*G07C 5/00* (2006.01)

(52) U.S. Cl.
CPC ........... *G07C 5/0808* (2013.01); *G07C 5/008* (2013.01)

(58) Field of Classification Search
CPC ........ G07C 5/0808; G07C 5/008; G07C 5/12; G06Q 10/0637
(Continued)

(56) References Cited

U.S. PATENT DOCUMENTS

| | | |
|---|---|---|
| 6,609,051 B2 | 8/2003 | Fiechter et al. |
| 2005/0055239 A1 | 10/2005 | Farmer |
| 2010/0042283 A1* | 2/2010 | Kell .................. G06Q 10/06 701/29.3 |

OTHER PUBLICATIONS

PCT Notification of Transmittal of the International Search Report; International Application No. PCT/US 16/20603; International Filing Date: Mar. 3, 2016; dated Jun. 27, 2016; pp. 1-8.
(Continued)

*Primary Examiner* — Brian P Sweeney
(74) *Attorney, Agent, or Firm* — Cantor Colburn LLP

(57) ABSTRACT

A system for providing fleet analytic services for a fleet includes a fleet interface to receive fleet data associated with operation and maintenance of the fleet; a memory to store the fleet data; a processor to implement a plurality of fleet analytic services modules to process and analyze fleet data for opportunities to improve maintenance, operations, costs, readiness, health and supply/logistics; a user input/output interface to receive commands from a user and output results of the plurality of fleet analytic services modules.

12 Claims, 11 Drawing Sheets

(58) Field of Classification Search
USPC .......................................................... 701/29.3
See application file for complete search history.

(56) References Cited

OTHER PUBLICATIONS

PCT Written Opinion; International Application No. PCT/US 16/20603; International Filing Date: Mar. 3, 2016; dated Jun. 27, 2016; pp. 1-5.

* cited by examiner

FLEET ANALYTIC SERVICES TOOLSET

CROSS REFERENCE TO RELATED APPLICATIONS

This application is a National Stage application of PCT/US2016/020603, filed Mar. 3, 2016, which claims the benefit of U.S. Provisional Patent Application No. 62/128,715, filed Mar. 5, 2015, both of which are incorporated by reference in their entirety herein.

BACKGROUND

Conventionally, product support has been largely reactive in nature. For example, an original equipment manufacturer (OEM) may provide maintenance or repair support for a product, such as an aircraft or a component of the aircraft, once a need for such support has manifested itself. Traditionally, opportunities for product and process improvements have been identified using anecdotal input from field personnel, typically in response to urgent tactical matters. Related analytical efforts have been simplistic in nature and based on small, often low-quality and delayed datasets.

SUMMARY

According to an aspect of the invention, a system for providing fleet analytic services for a fleet includes a fleet interface to receive fleet data associated with operation and maintenance of the fleet; a memory to store the fleet data; a processor to implement a plurality of fleet analytic services modules to process and analyze fleet data for opportunities to improve maintenance, operations, costs, readiness, health and supply/logistics; a user input/output interface to receive commands from a user and output results of the plurality of fleet analytic services modules.

In addition to one or more of the features described above or below, or as an alternative, further embodiments could include wherein the fleet analytic services modules include a data quality assurance module, the data quality assurance module to process the fleet data and generate corrected data.

In addition to one or more of the features described above or below, or as an alternative, further embodiments could include wherein the data quality assurance module is configured to provide a data quality report indicating of at least one of missing data, data formats, data changes since a prior report and data anomalies.

In addition to one or more of the features described above or below, or as an alternative, further embodiments could include wherein the fleet analytic services modules include a composer module, the composer module to receive the corrected data and generate conditioned data.

In addition to one or more of the features described above or below, or as an alternative, further embodiments could include wherein the composer module includes an automatic and/or manual conditioning interface to provide scoring of the corrected data in generation of the conditioned data.

In addition to one or more of the features described above or below, or as an alternative, further embodiments could include wherein the fleet analytic services modules include a fleet reference dashboard module configured to generate fleet status and/or demographic information.

In addition to one or more of the features described above or below, or as an alternative, further embodiments could include wherein the fleet analytic services modules include a maintenance and operations monitoring and alerting module configured to identify adverse operational, maintenance, cost and readiness drivers and trends within the fleet data.

In addition to one or more of the features described above or below, or as an alternative, further embodiments could include wherein the fleet analytic services modules include a maintenance and operations investigation module configured to reveal probable root-cause(s) of adverse drivers or trends in response to fleet data.

In addition to one or more of the features described above or below, or as an alternative, further embodiments could include wherein the fleet analytic services modules include a cost analysis module configured to provide cost drivers, trends and contributing factors in response to the fleet data.

In addition to one or more of the features described above or below, or as an alternative, further embodiments could include wherein the fleet analytic services modules include a readiness analysis module configured to provide fleet readiness drivers, trends and contributing factors in response to the fleet data.

In addition to one or more of the features described above or below, or as an alternative, further embodiments could include wherein the fleet analytic services modules include a health analysis module configured to detect anomalies and/or adverse current and/or future conditions in the fleet data and to provide feedback indicative of the anomalies.

In addition to one or more of the features described above or below, or as an alternative, further embodiments could include wherein the fleet analytic services modules include a maintenance optimization module configured to recommend maintenance actions in response to the fleet data.

In addition to one or more of the features described above or below, or as an alternative, further embodiments could include wherein the fleet analytic services modules include a supply optimization module configured to provide supply, demand, and inventory postures, and to recommend logistics, supply, repair, purchasing and/or production actions in response to the fleet data.

In addition to one or more of the features described above or below, or as an alternative, further embodiments could include wherein the fleet analytic services modules include: a data quality assurance module, the data quality assurance module to process the fleet data and generate corrected data; a composer module, the composer module to receive the corrected data and generate conditioned data; a fleet reference dashboard module configured to generate fleet status and/or demographic information in response to the conditioned data; a maintenance and operations monitoring and alerting module configured to identify adverse operational, maintenance, cost and readiness drivers and trends within the conditioned data; a maintenance and operations investigation module configured to reveal probable root-cause(s) of adverse drivers or trends in response to the conditioned data; a cost analysis module configured to provide cost drivers, trends and contributing factors in response to the conditioned data; a readiness analysis module configured to provide fleet readiness drivers, trends and contributing factors in response to the conditioned data; a health analysis module configured to detect anomalies and/or adverse current and/or future conditions in the conditioned data and to provide feedback indicative of the anomalies; a maintenance optimization module configured to recommend maintenance actions in response to the conditioned data; and a supply optimization module configured to provide supply, demand, and inventory postures, and to recommend logistics, supply, repair, purchasing and/or production actions in response to the conditioned data.

In addition to one or more of the features described above or below, or as an alternative, further embodiments could include wherein the fleet data includes data associated with an entire fleet of vehicles or products, data associated with a single vehicle or product and data associated with a component of a vehicle or product.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
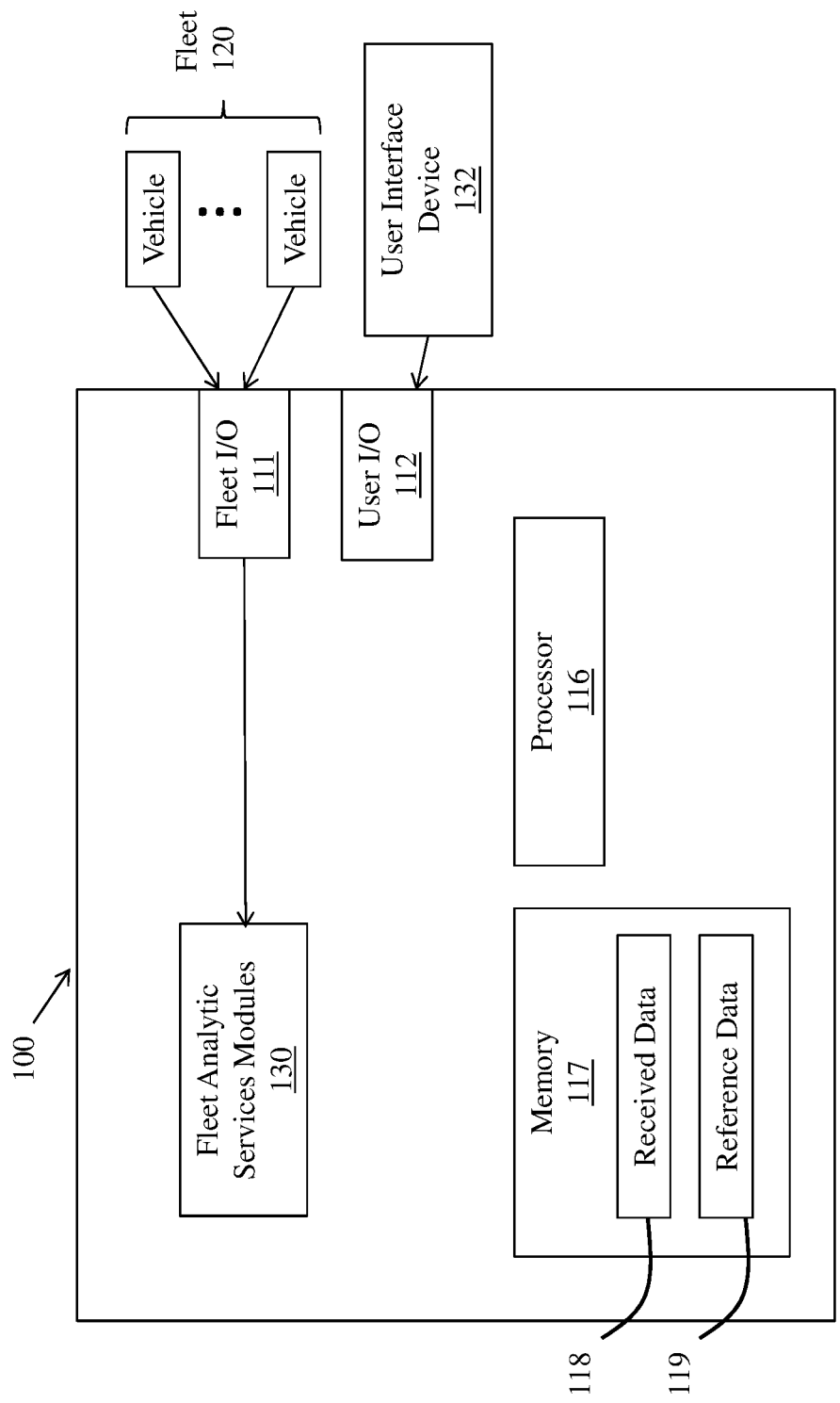
FIG. 1 depicts a fleet analytic services system in an exemplary embodiment.

FIG. 1 depicts a fleet analytic services system 100 in an exemplary embodiment. The fleet analytic services system 100 includes processor 116 and a memory 117. Processor 116 may be part of a known processor-based device such as a server, a personal computer, a laptop, a mobile device (e.g., a phone or smartphone), a PDA, a tablet, etc. Processor 116 may be part of distributed computing environment, such as a cloud computing facility.

Memory 117 may store executable instructions. The executable instructions may be stored or organized in any manner and at any level of abstraction, such as in connection with one or more applications, processes, routines, procedures, methods, etc. The instructions stored in the memory 117 may be executed by one or more processors, such as a processor 116. Memory 117 also stores data in the form of received data 118 and reference data 119. Received data 118 includes fleet data received from a fleet 120 of vehicles (such data may include electronic data extracted directly from vehicle systems and/or electronic data extracted from maintenance, operations and supply/logistics data systems associated with fleet support). Reference data 119 includes data to which the received fleet data may be compared for analysis, as described in further detail herein. Memory 117 may be co-located with processor 116, or remotely located from processor 116 and accessed by processor 116 via a network.

A fleet input/output interface 111 provides an interface for collecting fleet data from the fleet of vehicles 120. The fleet input/output interface 111 may receive data via a network connection, including both wired and wireless network connections.

A user input/output interface 112 provides for connection to user interface device(s) 132. The user input/output interface 112 may connect to the user interface device(s) 132 directly (e.g., wired) or remotely over a network (e.g., wired or wireless). The user interface device 132 may include known components such as a keyboard, mouse, display, etc. The user interface device may, in some configurations, be co-located with processor 116 and/or memory 117, or may utilize an additional processor and/or memory (not shown).

The fleet analytic services system 100 includes a plurality of fleet analytic services modules 130. Fleet analytic services modules 130 execute a variety of operations to discover and investigate adverse drivers, trends and contributing factors associated with vehicle health, cost, readiness and reliability. One or more of the fleet analytic services modules 130 may be implemented by processor 116 executing program code stored in memory 117. Alternatively, one or more of the fleet analytic services modules 130 may be implemented by dedicated hardware/software. The fleet analytic services modules 130 may also be distributed, such as in a cloud computing environment.

Figure 2:
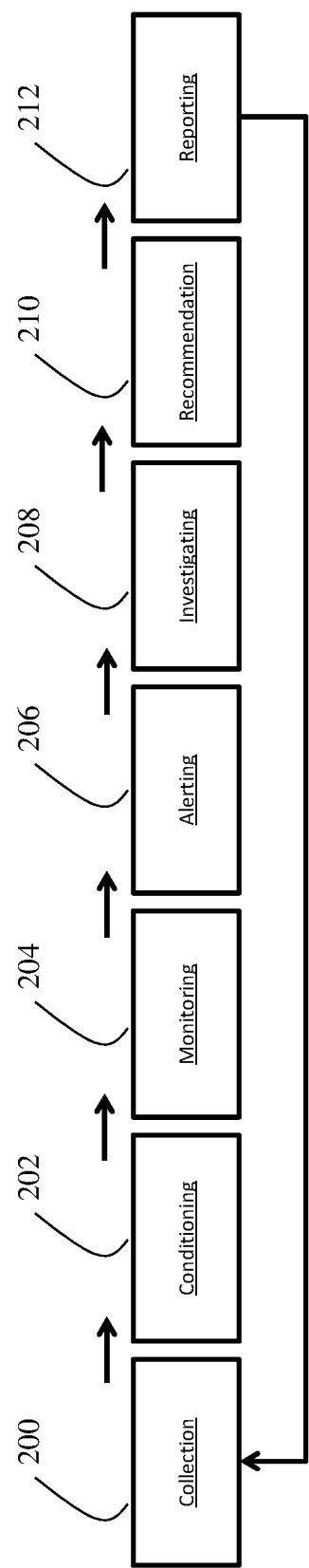
FIG. 2 depicts a fleet analytic services process flow in an exemplary embodiment.

FIG. 2 depicts a fleet analytic services process flow in an exemplary embodiment. The fleet analytic services process enables proactive discovery and investigation of adverse conditions associated with the fleet of vehicles 120 (including maintenance, operations and supply/logistics data systems associated with a vehicle fleet), and enables efficient and effective resolution of such adverse conditions. The fleet analytic services process includes a collection process 200, which includes reception of fleet data at fleet I/O interface 111 and storage of the fleet data into memory 117.

A conditioning process 202 includes conditioning the fleet data to facilitate analysis of the complete dataset. A monitoring process 204 includes monitoring of the fleet data for key attributes which may include health, cost, performance or profitability drivers and associated sub-elements. An alerting process 206 includes alerting of adverse conditions evident within the fleet data. Examples of adverse conditions include, but are not limited to: top cost, readiness and profitability drivers, adverse trend characteristics, outliers, threshold exceedances, statistical changes and variance from baselines or comparison populations. An investigation process 208 includes investigation of the adverse conditions, such as those mentioned above, in pursuit of root cause of the condition. A recommendation process 210 includes generating a recommendation for corrective action associated with the conditions and/or investigations. A reporting process 212 includes reporting of analytic outputs, recommendations, metrics and fleet information to process stakeholders. The fleet analytic services process of FIG. 2 is implemented by the fleet analytic services modules 130.

Figure 3:
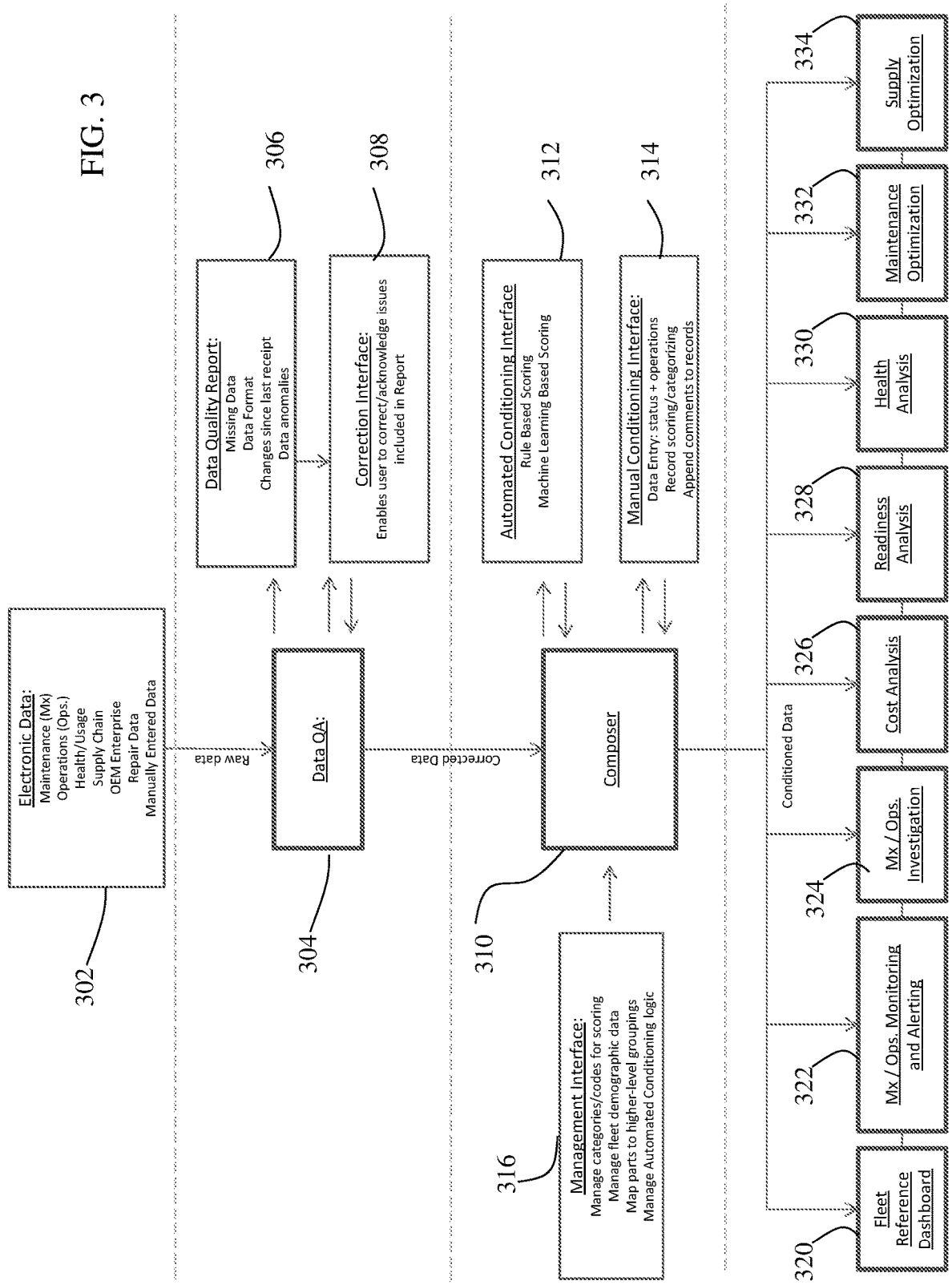
FIG. 3 depicts a plurality of fleet analytic services modules in an exemplary embodiment.

FIG. 3 depicts a plurality of fleet analytic services modules 130 in an exemplary embodiment. A data quality assurance module 304 receives raw fleet data 302. The fleet data 302 may include maintenance data, for example, component removal records, mean time between removal metrics, accumulated component usage/time, system/component fault data, maintenance schedules, inspection results, reliability metrics, component life-limits, component installation history, etc. The fleet data 302 may include operations data, for example, product usage history/schedule, product availability/readiness history/status, usage schedules, product locations, product missions, product operators, target performance parameters etc. The fleet data 302 may include supply-chain data, for example, vendor identifications, material costs/prices, shipping times, inventory levels/locations, new material orders, core returns, etc. The fleet data 302 may include health and/or usage data, for example, condition indicator data, health indicator data, parametric usage data, control inputs, temperatures, pressures, vibrations, regimes, system response data, speed, altitude, heading, environmental data, location, system faults/warnings, etc. The fleet data 302 may include OEM enterprise data, for example, component/system design and configuration data, expected/required performance and reliability parameters, safety/reliability/engineering analyses, product-support history, product technical publications, financial data, new delivery schedules, business forecasts, etc. The fleet data 302 may include repair data, for example, repair costs, scrap rate, repair actions/work-in-progress, repair-turnaround-times (RTAT), repair schedules, etc. The fleet data 302 may include data manually entered by analysts, for example, comments, results of investigation steps, supporting data, cross-reference information, any data not received electronically, etc. This fleet data 302 may be received electronically, in real-time or substantially real-time, and from one or more sources associated with vehicles in the fleet 120.

The data quality assurance module 304 receives the fleet data 302 and generates corrected data. The data quality assurance module 304 may provide a notification of any data continuity/integrity issues that need to be addressed regarding, for example, incoming operational and maintenance data from users or customers. The data quality assurance module 304 may provide visibility into received data relative to required data elements or values. Parameters may include whether or not data or information has been received or transmitted and whether the data is appropriately formatted. Inconsistencies or discrepancies may be flagged or highlighted. The data quality assurance module 304 detects a receipt or absence of expected data associated with the first set of data, changes in the dataset since prior analysis and data anomalies (e.g., values outside of expected or possible ranges, such as a product accumulating more than 24 hours of usage within a single day).

A data quality report 306 may be generated, potentially relative to a prior version of data or a previous report. The data quality report 306 may also include alerts or messages (e.g., status messages, data quality reports, missing data alerts, etc.). Such alerts or messages may be from the perspective of an individual product, an operator, or a data source. A correction interface 308 is associated with the data quality assurance module 304 may be provided for correcting inconsistencies in the fleet data, for example, reported daily usage time (e.g., flight hours).

The data quality assurance module 304 generates corrected data, which is provided to a composer module 310. The composer module 310 may use an automated conditioning interface 312 to resolve issues with incoming maintenance, operations, and supply-chain data prior to being used in downstream tools, analysis, and reports. The automated conditioning interface 312 automatically scores the corrected data from the data quality assurance module 304. The automated scoring includes correction and/or addition of data attributes that may include malfunction codes or other categorization (e.g. event types such as Scheduled or Unscheduled). This may be accomplished by user-defined rules, or by rules established by technologies such as Machine Learning.

A manual conditioning interface 314 allows a user to perform manual scoring of the corrected data. Manual scoring may include a categorization and/or correction of record data, such as malfunction codes, removal category (e.g., scheduled, unscheduled, directed, etc.), and other erroneous or unclear data contained in each record. A user may be able to manage data related to each aircraft or fielded product. The manual conditioning interface 314 may screen and categorize operator-supplied maintenance and operational records, in addition to supply-chain data, to facilitate fleet, operator and product level data analysis. The manual conditioning interface 314 may provide for the management of product operational and maintenance data. The manual conditioning interface 314 may be used to enter or edit data associated with delivered products, locations, and their owners/operators. The manual conditioning interface 314 may score part removal records supplied by operators and supply-chain data systems to identify removal category (scheduled, unscheduled, etc.) and the reason for removal (e.g., broken, burned, cracked, etc.). The manual conditioning interface 314 may score technical logs supplied by operators.

A management interface 316 to the composer module 310 allows a user to manage rules and categories applied by the composer module 310. The management interface 316 may track product status and product operational data. Such status/operational data may include a specification of product identification number, usage hours, location, customer, etc. The management interface 316 may manage categories and codes used during a scoring process or algorithm. The management interface 316 may enable the assignment of parts to proper part numbers or higher-level groupings (e.g., assemblies, etc.). The management interface 316 may manage categories and codes associated with data or information. Analysts may use such parameters for (further) categorization and conditioning of incoming data. The management interface 316 may manage product data such as locations, and owners/operator, in-service data, status, etc.

The composer module 310 generates conditioned data for use by one or more fleet analytic services modules 320-334. Each of these modules is described herein. The outputs generated by each module 320-334 may be shared with one or more other modules 320-334 for further analysis and/or processing.

Figure 4:
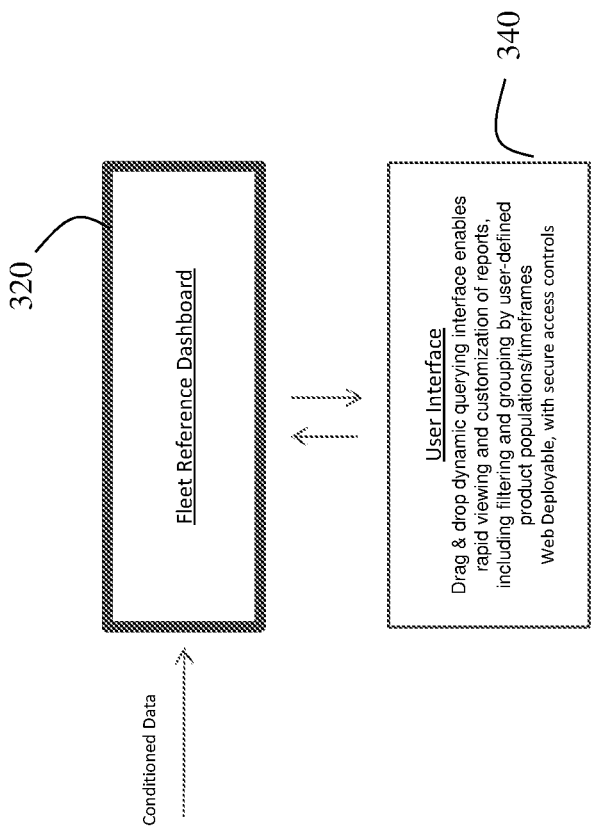
FIG. 4 depicts a fleet reference dashboard module in an exemplary embodiment.

FIG. 4 depicts a fleet reference dashboard module 320 in an exemplary embodiment. The fleet reference dashboard module 320 may provide a comprehensive report, containing real-time or substantially real-time data and feedback may be provided regarding product (e.g., aircraft) or fleet status information, potentially based on customer or user data imports. The data may include usage time (e.g., flight hours), product operational status, and status history, usage forecasts, product locations, product identification/ownership data, component removal trending at specific part grouping levels with statistical thresholds, and top removal drivers. A usage (e.g., flight hour) breakdown may be provided, potentially in terms of mission, region, operator, and high time product, along with cumulative, monthly, and projected monthly usage time (e.g., flight hours).

The fleet reference dashboard module 320 may provide data to a user interface 340 or to other fleet analytics services modules. This data may include product usage history data, current status data, and projections (e.g., usage projections). This data may also include product readiness status and status history data or information. This data may include fleet demographic information. This data may also include fleet performance data (e.g., availability rate, reliability metrics, etc.). More generally, the fleet reference dashboard module 320 may provide metrics, and those metrics may pertain to one or more of: usage metrics, forecasted usage metrics, a location of at least one product, device of the product, and component of the product, an identification of an owner of the product, and component removal or other maintenance trends at specified grouping levels with statistical thresholds.

The fleet reference dashboard module 320 includes a user interface 340. User interface 340 may incorporate mapping algorithms, such as commercially available mapping algorithms, that enable users to zoom into any region of the world and view details on operators and product (e.g. aircraft) operating (e.g., flying) in the region. User interface 340 may be a web-deployable interface, with secure access controls. User interface 340 may provide a drag-and-drop dynamic querying interface. Such an interface may enable rapid presentation of data or information. User interface 340 may enable a customization of reports. Filtering and grouping may be provided, potentially based on user-defined aircraft populations.

Figure 5:
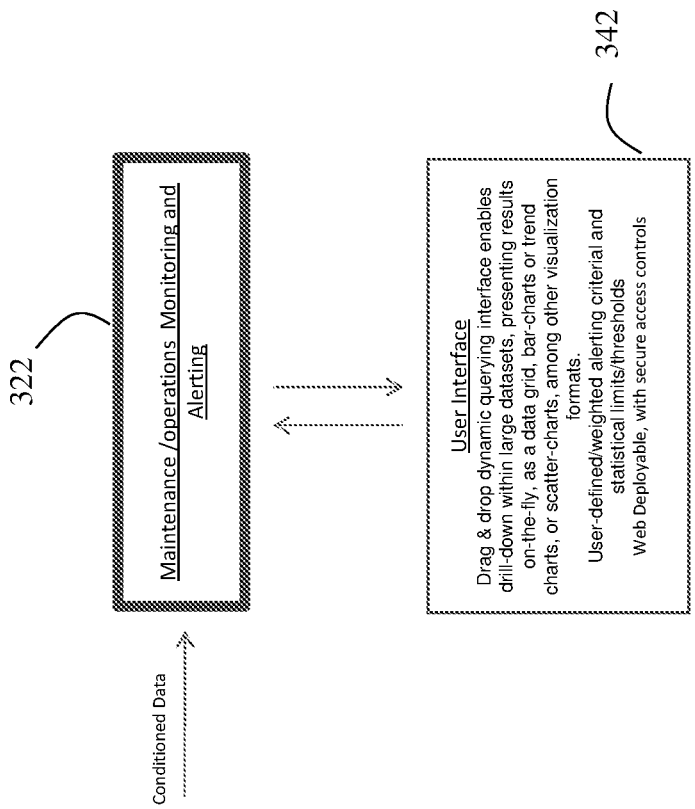
FIG. 5 depicts a maintenance/operations monitoring and alerting module in an exemplary embodiment.

FIG. 5 depicts a maintenance/operations monitoring/alerting module 322 in an exemplary embodiment. The maintenance/operations monitoring/alerting module 322 may process one or both of maintenance data and operations data. The maintenance/operations monitoring/alerting module 322 provides for quick and efficient identification of adverse operational and maintenance drivers and trends within product (e.g. aircraft) data or fleet data. A deep-dive data analysis may be provided with total review control of maintenance, operational, and supply-chain data. Filtering, sorting, grouping, and conditional formatting may be provided, potentially on-the-fly and with little effort, and potentially without resorting to database querying techniques. Access to component removal/inoperability, cost, and readiness data may be provided. Such data may also include calculated rates or trends (e.g. removals per flight hour, or cost per flight hour).

The maintenance/operations monitoring/alerting module 322 may provide the ability to group components or devices by part number and to rank these based on severity of adverse rate and/or trend characteristics, such as frequency, percentage change, slope, exceedance of thresholds, variation from baselines or standard deviation over variable periods of time.

Using the maintenance/operations monitoring/alerting module 322, alert triggers may be defined based on statistical thresholds and forecasted and speculated values. In some embodiments, such alerts or messages may be generated when a given parameter exceeds a threshold. With this functionality, a user may be able to manage a weighting of different factors or parameters that contribute to alert or message severity for multi-perspective prioritization purposes. In this manner, a user may be directed to issues requiring the most immediate attention, thereby enabling a small pool of users to handle large fleets or datasets.

The maintenance/operations monitoring/alerting 322 may provide alerts based on pre-defined and user defined or weighted criteria and statistical limits. The maintenance/operations monitoring/alerting module 322 may prioritize analytical investigations based on severity and impact relative to key parameters such as health, cost, readiness, profitability, etc.

The maintenance/operations monitoring/alerting module 322 analyzes the conditioned data and provides data including: automatic alerts based on pre-defined and user defined/weighted criteria and statistical limits. Such criteria and limits may be assessed directly against the first set of data, or computations (e.g., rates, trends, statistical characteristics, etc.) made from the conditioned set. Top-level key performance parameters (KPP) (e.g. fleet wide operational cost, readiness rates, reliability figures, program profit drivers, etc.) and sub-elements (e.g., individual product/component contributions to KPPs, logistics delay times, repair times, repair costs, replacement costs, scrap rates, etc.). The maintenance/operations monitoring/alerting module 322 may provide prioritized candidates for analytical investigations based on severity and impact from various perspectives. Such prioritizations may be based on KPPs, KPP sub elements, alerts, computations or other criteria.

The maintenance/operations monitoring/alerting module 322 includes a user interface 342. User interface 342 may provide a drag-and-drop dynamic querying interface. User interface 342 may enable a user to drill-down within large datasets and present results in one or more formats (e.g., a data grid, bar charts, line charts, trend charts, scatter charts, graphs, etc.).

Figure 6:
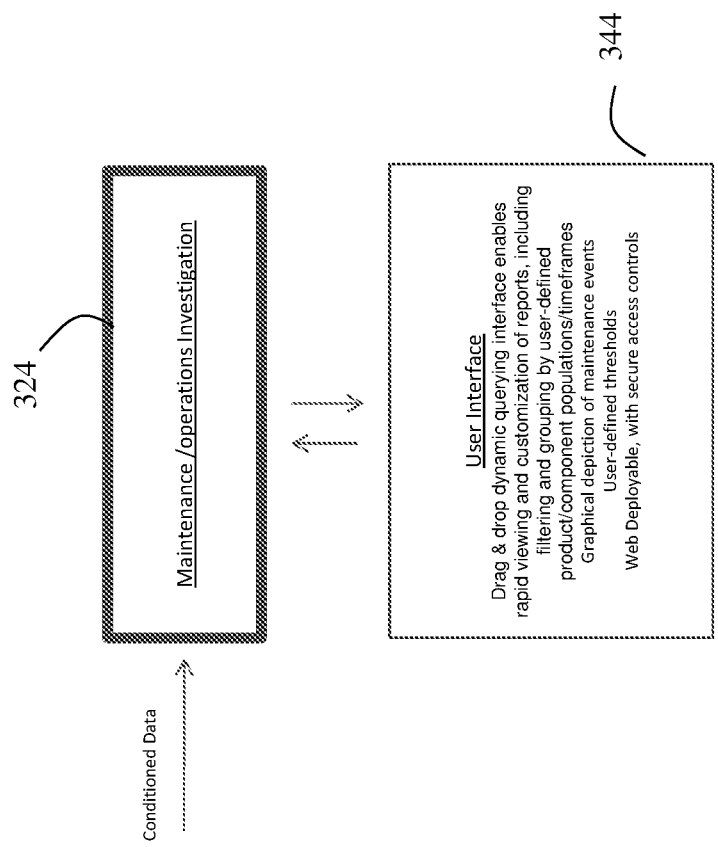
FIG. 6 depicts a maintenance/operations investigation module in an exemplary embodiment.

FIG. 6 depicts a maintenance/operations investigation module 324 in an exemplary embodiment. The maintenance/operations investigation module 324 may process one or both of maintenance and operations data. The maintenance/operations investigation module 324 provides correlations/relationships/dependencies within data, comparisons between product populations or individual products, anomalous maintenance/operational patterns, clusters of maintenance/usage activity, component(s) removal/fault/event rates/trends/proximities of occurrences, alerts of above data/computations, based on user-defined criteria, and a depiction of a component or product's history, including details such as the physical location of the product or component throughout its history and/or environmental, health, usage and/or maintenance/repair events and/or parameters accumulated or experienced at each location throughout a component's history.

The maintenance/operations investigation module 324 may facilitate discovery of causal relationships within fleet data and comparisons between product populations or individual products across various timeframes. The maintenance/operations investigation module 324 may reveal anomalous maintenance/operational patterns (e.g., multiple removals of one type of component from a system in short succession).

The maintenance/operations investigation module 324 may enable an analyst to identify certain types of maintenance behavior typically resulting from deficiencies in local maintenance practices/capabilities, technical manuals, and/or linkages between inoperability of components or devices within a system (e.g., an aircraft). These situations can manifest themselves as maintenance activity related to individual components or groups of components within a system occurring in short succession on the same aircraft (or other types of product). The maintenance/operations investigation module 324 may reveal such situations or conditions by employing a graphical methodology and/or automated pattern-recognition logic to aid in the analysis of maintenance-record data. Through these approaches, relationships between the type of maintenance (scheduled, unscheduled, etc.), maintenance action, and component/device function may become evident. In addition, clusters of maintenance activity may be easily perceived and dissected. Automated features of the maintenance/operations investigation module 324 may offer a reduction in time needed to identify and evaluate maintenance patterns of interest and may provide a format that is easily presented to and digested by supporting tools or disciplines.

The maintenance/operations investigation module 324 may provide a computation of component removal and rates or proximities related to system inoperability. For example, the proximities data may be analyzed to determine relationships or groupings between components and devices that are causing (or are likely causing) an aircraft or other product to be inoperable.

The maintenance/operations investigation module 324 may provide threshold setting and exceedance reporting capabilities to the user. Such capabilities may be used to identify repeat maintenance occurrences on given components/devices or groups of components/devices that have occurred within the threshold amount of time relative to one another. Such repeat occurrences may be deserving of an allocation of additional resources or scrutiny.

The maintenance/operations investigation module 324 may provide a detailed depiction of a component or product's history. Details such as the physical location of the product or component (e.g., in inventory, in transit, installed on a product, etc.) throughout its history (e.g., since its original manufacture up to its current location) may be provided within the module. Additionally, the maintenance/operations investigation module 324 may provide a depiction or description of environmental, health, usage and/or maintenance/repair events and/or parameters accumulated or experienced at each location throughout a component's history (e.g., a component accrued 100 flight-hours while installed on a specific aircraft; or, a component was subjected to 75 degree temperatures while in a specific inventory location). The maintenance/operations investigation module 324 may provide the capability to analyze history from multiple perspectives relative to the subject product or components (e.g., which engines have been installed on a subject vehicle; or: which vehicles has a subject engine been installed on).

The maintenance/operations investigation module 324 includes a user interface 344. The user interface 344 may provide drag & drop dynamic querying interface enables rapid viewing and customization of reports, including filtering and grouping by user-defined product/component populations/timeframes, graphical depiction of maintenance/operational events, graphical or tabular depiction of component/product historical information (e.g., locations, installations, usage, health, etc.), capability to analyze history from multiple perspectives relative to the subject product or components, highlighting of missing, incomplete or suspicious historical data, user-defined alerting thresholds and web deployability, with secure access controls. Additionally, user interface 344 may provide a graphical depiction of maintenance events. For example, a scatter-chart may be provided to reveal clusters of maintenance activity indicative of inefficient maintenance behavior or actions. As an additional example, a graphical timeline may be provided, showing an individual component's installation, usage, repair and logistics history. User interface 344 may provide options for user-selectable aircraft/component/device populations and timeframes. User interface 344 may also provide maintenance-type filtering. Results may be provided graphically (e.g., a segmented timeline) or in tabular format. User interface 344 may highlight missing, incomplete or suspicious data.

Figure 7:
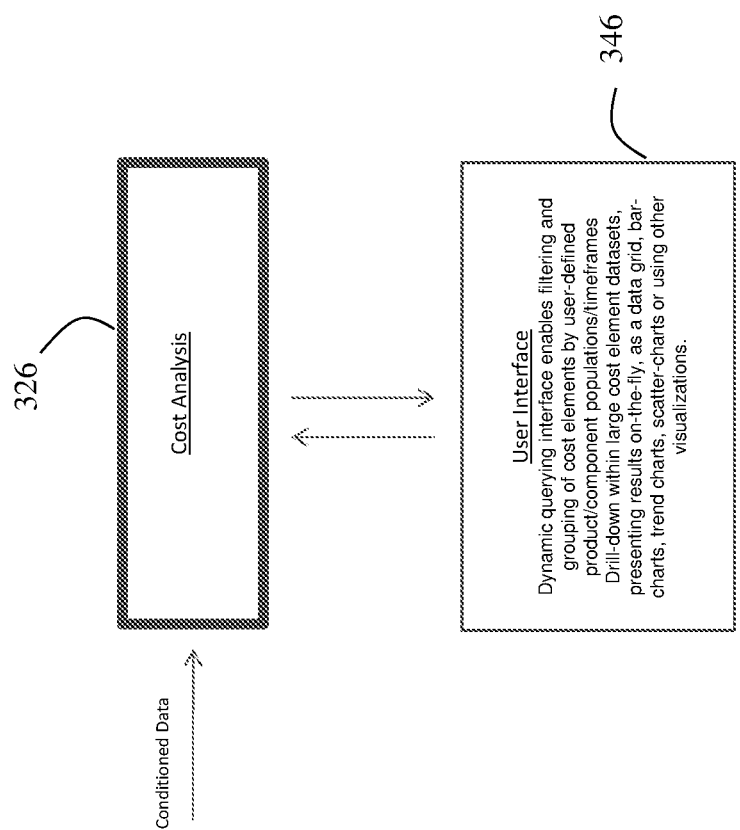
FIG. 7 depicts a cost analysis module in an exemplary embodiment.

FIG. 7 depicts a cost analysis module 326 in an exemplary embodiment. The cost analysis module 326 provides product (e.g., aircraft) component cost data and associated metrics, potentially from multiple perspectives. Such data and metrics may provide an awareness of cost drivers and their severities across various timeframes and populations of products.

The cost analysis module 326 may provide a spectrum of cost breakdown reports that may assist a user or analyst in gaining insight into cost drivers at the fleet, operator, or product (or other relevant grouping) level. Comparisons of operator cost performance may be provided at system and options levels. Electronic cost data received from supply chain operations and other business operations may be utilized by the cost analysis tool in generating one or more outputs.

The cost analysis module 326 may enable cost driver analysis at multiple levels of fidelity. For example, such analysis may be provided at the fleet, operator, or product (e.g., aircraft tail number) level. The cost analysis module 326 may provide a comprehensive breakdown in terms of cost based on several business criteria or factors. The cost analysis module 326 may provide a secure, readily available enterprise-wide and automated real-time data feed.

The cost analysis module 326 may provide the actual cost per unit of usage incurred by the fleet (e.g., cost per flight hour, or cost per mile traveled). A capability to drill-down into the status of an individual product (e.g. aircraft tail number), or a component or device of the product, may be provided.

The cost analysis module 326 may dissect cost into driving-factors. Such factors may include an analysis of a product population (or a component or device) in terms of a ratio of new and used material comprising it. Other examples of cost factors are unscheduled component removal rates, scrap rates, repair costs, replacement material costs, maintenance costs, etc.

The cost analysis module 326 may provide aggregated and individual component/product/fleet cost drivers/trends, including rates (e.g., cost per usage hour) breakdown of component/product/fleet cost rates/driver/trends into contributing sub-elements (e.g., scrap rate, new unit cost, average repair cost, unscheduled removal rate). The cost analysis module 326 may provide a ranking of cost drivers based on user-defined criteria. The cost analysis module 326 may provide cost comparisons between product populations, individual products, timeframes and other characteristics (e.g., product warranty status). The cost analysis module 326 may allow for differentiation between costs incurred during a product's warranty (or other special contract) period from those incurred outside of the warranty period.

The cost analysis module 326 includes a user interface 346. The user interface 346 may provide dynamic querying interface enables filtering and grouping of cost elements by user-defined product/component populations/timeframes, drill-down within large cost element datasets, presenting results on-the-fly, as a data grid, bar-charts, trend charts, scatter-charts or using other visualizations. User interface 346 may be web deployable, with secure access controls.

Figure 8:
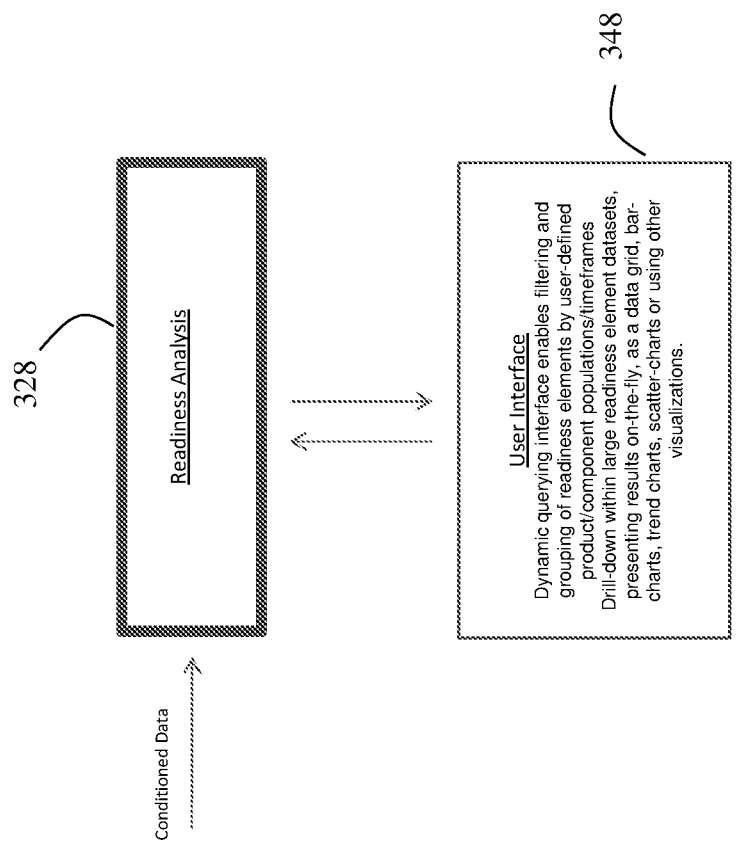
FIG. 8 depicts a readiness analysis module in an exemplary embodiment.

FIG. 8 depicts a readiness analysis module 328 in an exemplary embodiment. The readiness analysis module 328 may provide fleet readiness data and associated metrics, potentially from multiple perspectives. Such data may be used to maintain or provide an awareness of readiness drivers and their severities across various timeframes and populations of products within a fleet. Availability information or data may be provided graphically and in tabular format by the availability analysis tool. Drivers of product availability may be expressed in terms of mission type, fleet, operator, location or other key characteristics. The readiness analysis module 328 may provide aggregated availability rates.

The readiness analysis module 328 may provide visibility into computed availability rates and observed availability drivers. Data may be provided in one or more formats, such as charts, graphs, or tables. An analysis based on user-defined populations may be provided. Such definitions may be based on one or more of: region, missing, product (e.g., aircraft tail number), operator, country, component, device, type of availability (e.g., scheduled, unscheduled, etc.) and variable timeframes.

The readiness analysis module 328 may enable user-specified comparisons to take place between a first population and one or more additional populations and/or timeframes.

The readiness analysis module 328 may provide aggregated component/product/fleet readiness rates, and associated readiness drivers and trends. The readiness analysis module 328 may provide breakdown of component/product/fleet readiness rates/driver/trends into sub-elements. The readiness analysis module 328 may provide ranking of readiness drivers. The readiness analysis module 328 may provide readiness comparisons between product populations or individual products.

The readiness analysis module 328 includes a user interface 348. User interface 348 provides a drill-down capability that may be provided from top-level metrics to details surrounding individual events/status (e.g., individual availability events/status). User interface 348 may be highly dynamic and may allow for a definition of a fleet population for analysis by sorting/filtering/multi-selecting descriptive data-fields-on-the-fly. User interface 348 may provide drill-down within large readiness element datasets, presenting results on-the-fly, as a data grid, bar-charts, trend charts, scatter-charts or using other visualizations. User interface 348 may provide a dynamic querying interface which enables filtering and grouping of readiness metrics and elements by user-defined product/component populations/timeframes (e.g., customer, region, product identification, readiness due only to scheduled or unscheduled maintenance, etc.).

Figure 9:
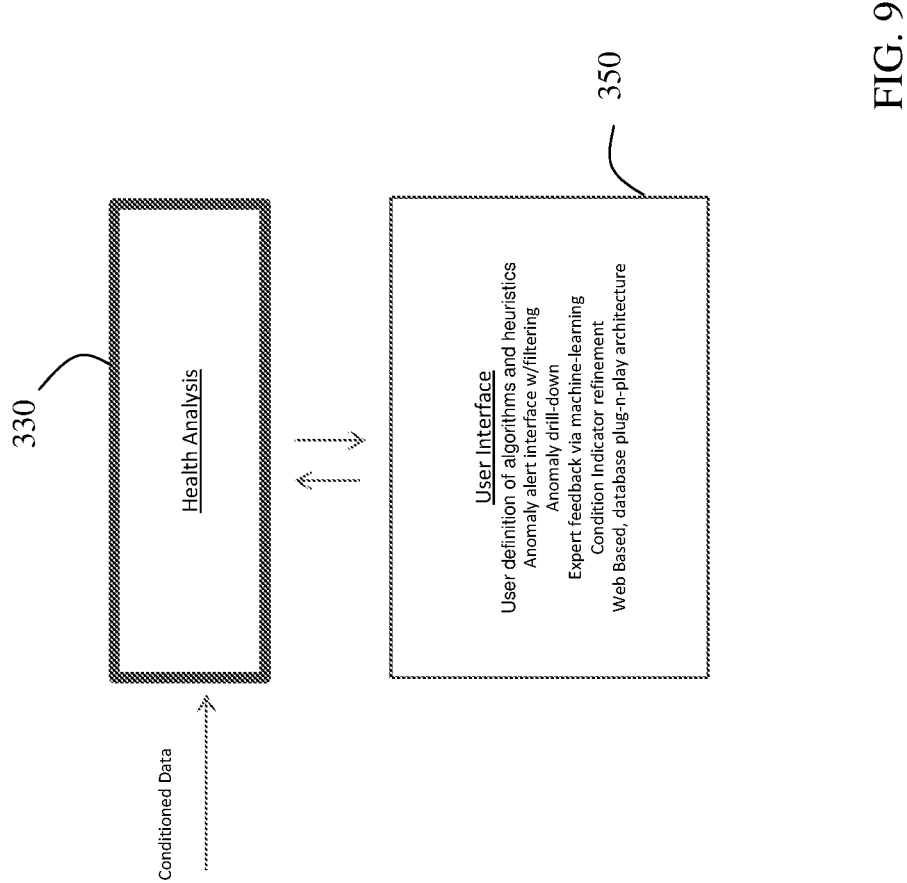
FIG. 9 depicts a health analysis module in an exemplary embodiment.

FIG. 9 depicts a health analysis module 330 in an exemplary embodiment. The health analysis module 330 may be used to aggregate and process data from a number of data sources. Such data may include system/component health-related data, which may originate from a product (e.g., an aircraft) and may be based on an operation (e.g., flight) of the product. The data may be extracted and accumulated with data from across a fleet of products. The data may be used by engineers to perform post-hoc analysis of condition indicator data.

The health analysis module 330 may provide an ability to deploy algorithms, set thresholds and define heuristics to automatically find and produce alerts of anomalies in incoming condition indicator data. Specifically, these anomalous features may include: a sudden shift in the mean of the data, gaps in the data, an increase in scatter of the data, a trend in the data, or isolated jumps in the data. The health analysis module 330 may monitor incoming data and automatically detect anomalies in the data to provide feedback before adverse situations (further) develop or cross predetermined thresholds. The health analysis module 330 may provide an overview of any anomalies, enable expert feedback, and provide a technique for finding combinations of anomalies based on rules or heuristics. In some embodiments, automation may be provided to reduce the need for manual data mining, thereby reducing the number of missed anomalies (potentially due to human error) while quickly providing anomaly summaries for an individual product or group of products (e.g., aircraft fleet).

The health analysis module 330 may provide automated, data-driven anomaly detection. The health analysis module 330 may reveal variations in behavior at the component and condition-indicator (CI) level. The health analysis module 330 may provide a fleet anomaly overview with drill-down capability.

The health analysis module 330 may provide identification and automatic alerts of anomalies within component and condition indicator data (e.g., mean shift, change in scatter of the data, trends/gaps/steps/jumps within data, exceedances). Such identification and alerting may be based on user-defined algorithms and heuristics.

The health analysis module 330 includes a user interface 350. User interface 350 may provide user definition of algorithms (including multivariate algorithms) and heuristics, an anomaly alert interface w/filtering and anomaly overlays, anomaly drill-down, expert feedback via machine-learning, and condition indicator refinement. User interface 350 may be implemented with a web based, database plug-n-play architecture.

Figure 10:
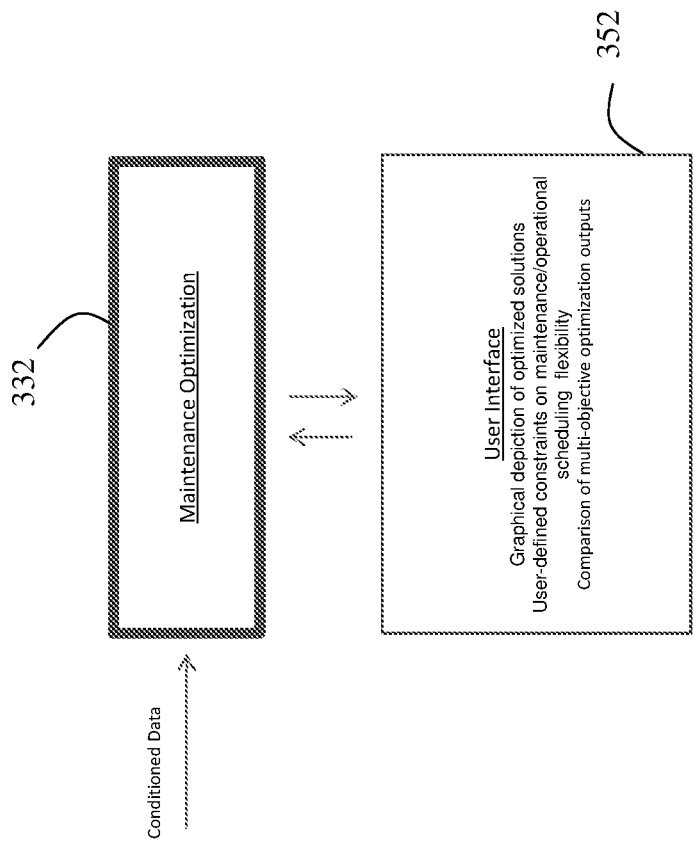
FIG. 10 depicts a maintenance optimization module in an exemplary embodiment.

FIG. 10 depicts a maintenance optimization module 332 in an exemplary embodiment. The maintenance optimization module 332 may provide for a formulation of recommendations for maintenance actions (e.g., inspections, replacements, maintenance consolidation, etc.). The recommendations may be based on product-health condition-indicators and opportunistic factors associated with scheduled maintenance, planned usage, and cost factors.

The maintenance optimization module 332 may reveal maintenance tasks that may be consolidated. The maintenance optimization module 332 may provide flexibility for maintenance actions to be planned or bundled with other maintenance tasks in order to reduce costs and to minimize unavailability. Additionally, the maintenance optimization module 332 may identify proactive maintenance activities to perform.

The maintenance optimization module 332 may monitor the health of components or devices. The maintenance optimization module 332 may compute a projected degradation of one or more components or devices. Such a computation may be based on a current health status and forecasted usage.

The maintenance optimization module 332 may employ multi-objective optimization schemes to provide potential courses-of-action. Associated cost/risk profiles may be generated for each potential course-of-action. A potential schedule of maintenance activities may be analyzed or adjusted based on each potential course-of-action.

The maintenance optimization module 332 may consider numerous inputs or conditions in generating one or more outputs. Such inputs may include health and usage monitoring systems (HUMS) condition indications, usage history, usage projections, cost, resource availability and maintenance schedules.

The maintenance optimization module 332 may accept or receive constraints. Such constraints may be manually entered or added to the maintenance optimization tool. The constraints may be based on maintenance/operational scheduling, resource availability, and/or any flexibility associated with the maintenance/operational scheduling.

The maintenance optimization module 332 may provide opportunities to consolidate maintenance tasks, perform proactive maintenance or defer maintenance. Possible courses-of-action and associated cost/risk/schedule profiles for each may be provided. Such output may be based on multi-objective optimization schemes. The maintenance optimization module 332 may provide a correlation of maintenance and HUMS data.

The maintenance optimization module 332 includes a user interface 352. The user interface 352 provides a graphical depiction of optimized solutions. User interface 352 provides entry of user-defined constraints on maintenance/operational scheduling flexibility and cost targets/limits. User interface 352 provides comparison of multi-objective optimization outputs. The user interface 352 also provides the ability to review all data used for optimization calculations, and may do so in a graphical and/or tabular format.

Figure 11:
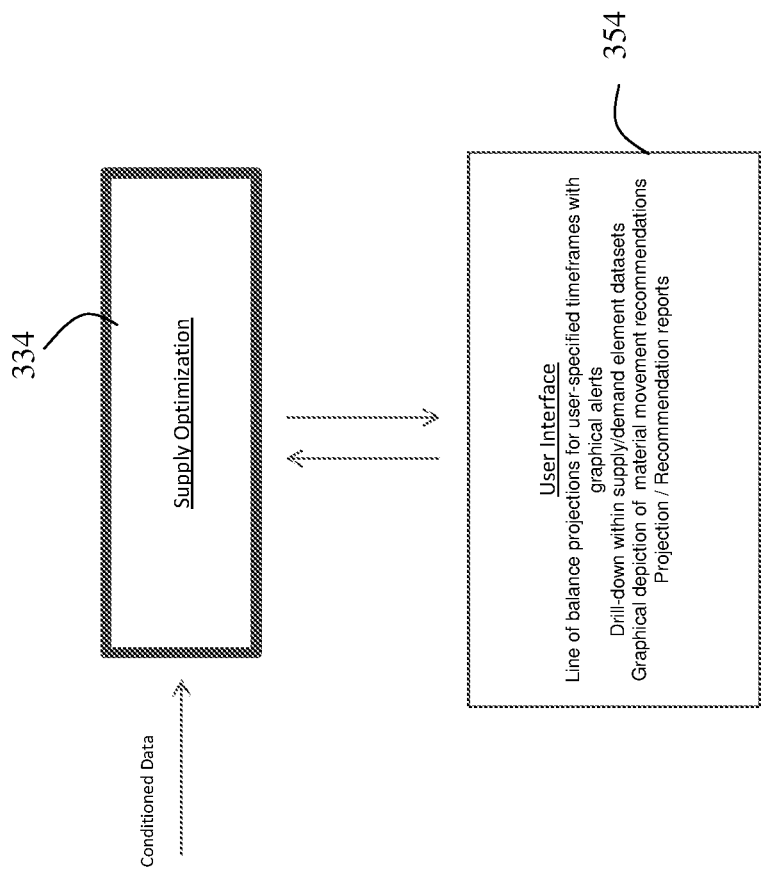
FIG. 11 depicts a supply optimization module in an exemplary embodiment.

FIG. 11 depicts a supply optimization module 334 in an exemplary embodiment. The supply optimization module 334 may fuse various data, including supply-chain data to compute supply, demand, and resulting inventory postures, in an effort to effectively meet those demands while minimizing cost. An optimized line-of-balance function that compares forecasted demand with inventory and supply posture to provide guidance on inventory management may be provided. Material demand may be monitored and projected. An alert or status message may be provided, such as when shortages or surpluses in excess (or below) a threshold are encountered or predicted. The supply optimization module 334 may forecast demand globally, or at specific locations such as at a forward stocking location (FSL). The supply optimization module 334 may provide recommendations concerning prioritization of repair schedules. Material or equipment movements may be recommended to balance inventory across all FSLs (or other locations), with a goal of meeting demand while minimizing costs.

The supply optimization module 334 may calculate a fleet/customer/product (e.g., aircraft tail number) level scheduled and unscheduled demand forecast over a period of time (e.g., monthly) using, e.g., one or more of: time on component at the point of install, operational tempo (optempo), mean time between unscheduled removal (MT-BUR) factors, component health, repair turnaround time (RTAT), scrap rate, current inventory levels, current backlog, and current parts on order. The supply optimization module 334 may produce or generate a core-return forecast.

The supply optimization module 334 may provide alerts or messages. Such alerts or messages may pertain to projected surplus, shortages, balances, and demand relative to supply.

The supply optimization module 334 may determine optimal inventory levels needed to accommodate future scheduled and unscheduled maintenance activities. Such inventory levels may be computed by the tool in order to minimize production, inventory, and maintenance costs. Inventory levels may be optimized through re-distribution, production and repair scheduling based on user-defined bounds and parts coupling.

The supply optimization module 334 may recommend material transfers between FSLs (or other locations) for inventory optimization. The supply optimization module 334 may recommend initiation of repairs and new component production to meet forecasted demand.

The supply optimization module 334 may provide projections based on user-defined product populations and timeframes (e.g., fleet, individual products, all products within a location, etc.). The supply optimization module 334 provides recommendations to meet future demands while minimizing cost (e.g., production, inventory and transportation costs). Such recommendations may take the form of guidance on inventory movement/management (including repair schedule prioritization, repair initiations, production/purchases of new material) and may target global inventory as well as individual inventory locations (e.g., forward stocking locations). These recommendations may include optimal inventory levels, and timing to correspond with projected scheduled and unscheduled events. The supply optimization module 334 may provide material demand forecasts, core return forecasts and prioritized repair schedules.

The supply optimization module 334 includes a user interface 354. User interface 354 may provide line of balance projections for user-specified timeframes with graphical alerts. User interface 354 may provide drill-down capability within supply/demand element datasets. User interface 354 may provide a graphical depiction of material movement recommendations. User interface 354 may provide projection and/or recommendation reports. User interface 354 may enable users to set constraints to be used within optimization computations.

Technical effects of embodiments of the invention include the ability to provide fleet analytic services on large volumes of fleet data. Fleet analytic services provide data related to parameters such as maintenance, operations, costs, readiness, health and supply.

It is noted that various connections are set forth between elements in the description and in the drawings. It is noted that these connections in general and, unless specified otherwise, may be direct or indirect and that this specification is not intended to be limiting in this respect. In this respect, a coupling between entities may refer to either a direct or an indirect connection.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system for generating fleet analytic services for a fleet, the system comprising:
    a fleet interface to receive fleet data associated with operation and maintenance of the fleet;
    a user input/output interface to receive commands from a user and output results;
    a memory for storing fleet data and having computer readable instructions; and
    one or more processors for executing the computer readable instructions, the computer readable instructions controlling the one or more processors to perform operations comprising:
        analyzing fleet data for opportunities to improve maintenance, operations, costs, readiness, health and supply/logistics,
        identifying adverse operational, maintenance, cost, and readiness drivers and trends within the fleet data based on analysis of maintenance and operations, and generating readiness drivers of a first population of vehicles and readiness drivers of a second population of vehicles, wherein the fleet data includes data associated with an entire fleet of vehicles or products, data associated with a single vehicle or product, or data associated with a component of a vehicle or product.

2. The system of claim 1, wherein the one or more processors further perform operations comprising processing the fleet data and generate corrected data.

3. The system of claim 2, wherein the one or more processors further perform operations comprising generating a data quality report indicating of at least one of missing data, data formats, data changes since a prior report and data anomalies.

4. The system of claim 2, wherein the one or more processors further perform operations comprising calculating scoring of the corrected data in generation of the conditioned data.

5. The system of claim 1, wherein the one or more processors further perform operations comprising generating fleet status and/or demographic information.

6. The system of claim 1, wherein the one or more processors further perform operations comprising revealing probable root-cause(s) of adverse drivers or trends in response to fleet data.

7. The system of claim 1, wherein the one or more processors further perform operations comprising generating cost drivers, trends and contributing factors in response to the fleet data.

8. The system of claim 1, wherein the one or more processors further perform operations comprising determining fleet readiness drivers, trends and contributing factors in response to the fleet data.

9. The system of claim 1, wherein the one or more processors further perform operations comprising detecting anomalies and/or adverse current and/or future conditions in the fleet data and determining feedback indicative of the anomalies.

10. The system of claim 1, wherein the one or more processors further perform operations comprising recommending maintenance actions in response to the fleet data.

11. The system of claim 1, wherein the one or more processors further perform operations comprising generating supply, demand, and inventory postures, and to recommend logistics, supply, repair, purchasing and/or production actions in response to the fleet data.

12. The system of claim 1, wherein the one or more processors further perform operations comprising:

processing the fleet data and generate corrected data;

receiving the corrected data and generate conditioned data;

generating fleet status and/or demographic information in response to the conditioned data;

identifying adverse operational, maintenance, cost and readiness drivers and trends within the conditioned data;

revealing probable root-cause(s) of adverse drivers or trends in response to the conditioned data;

determining cost drivers, trends and contributing factors in response to the conditioned data;

generating fleet readiness drivers, trends and contributing factors in response to the conditioned data;

detecting anomalies and/or adverse current and/or future conditions in the conditioned data and to generate feedback indicative of the anomalies;

recommending maintenance actions in response to the conditioned data; and supply, demand, and inventory postures, and recommending logistics, supply, repair, purchasing and/or production actions in response to the conditioned data.

* * * * *